F. E. MORTIMER.
FILM CLEANING DEVICE.
APPLICATION FILED APR. 6, 1910.
977,466.
Patented Dec. 6, 1910.
2 SHEETS—SHEET 1.
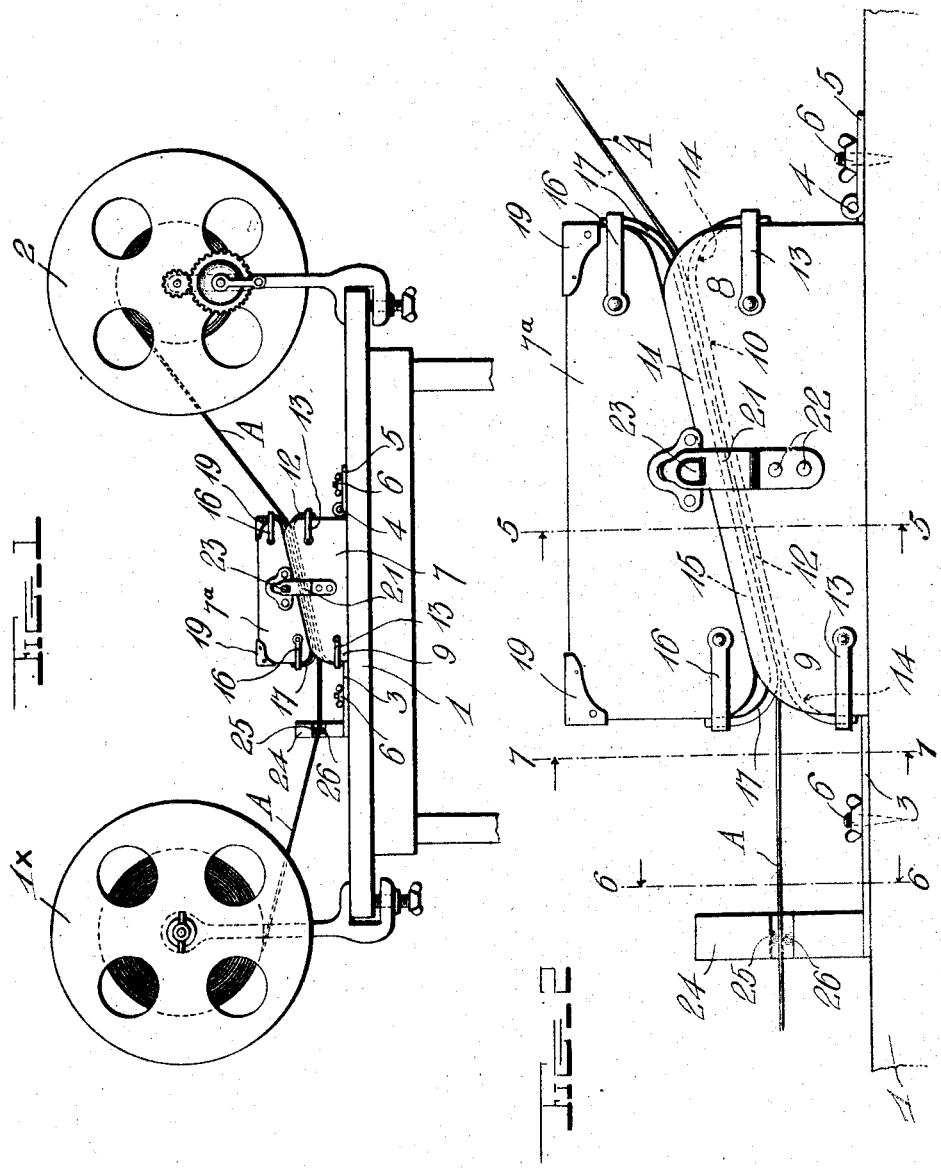
Witnesses
Inventor
Frederick E. Mortimer
by
Attorney F. E. MORTIMER.
FILM CLEANING DEVICE.
APPLICATION FILED APR. 6, 1910.
977,466.
Patented Dec. 6, 1910.
2 SHEETS—SHEET 2.
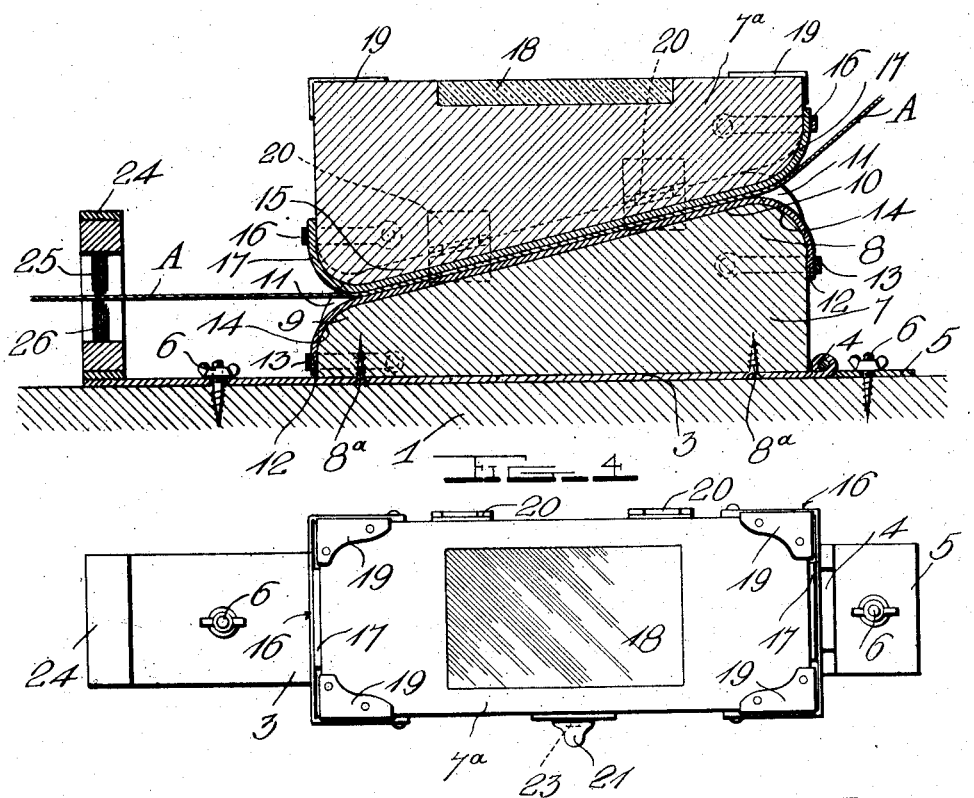
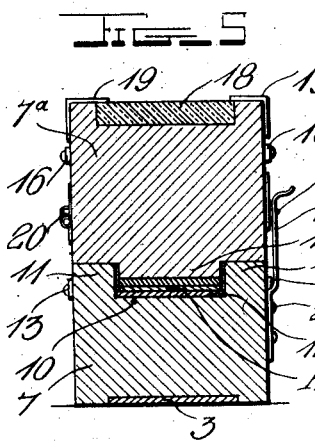
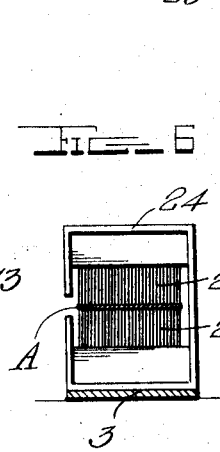
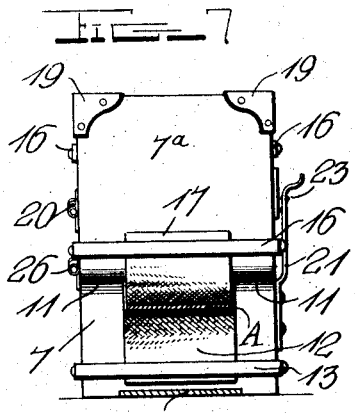
Witnesses
Inventor
Frederick E. Mortimer
by
Attorney

UNITED STATES PATENT OFFICE.

FREDERICK E. MORTIMER, OF BOSTON, MASSACHUSETTS, ASSIGNOR OF ONE-HALF TO JENNIE E. HUTCHINGS, OF BOSTON, MASSACHUSETTS.

FILM-CLEANING DEVICE.

977,466.  Specification of Letters Patent.  Patented Dec. 6, 1910.

Application filed April 6, 1910.  Serial No. 553,815.

*To all whom it may concern:*

Be it known that I, FREDERICK E. MORTIMER, a citizen of the United States, residing at Boston, in the county of Suffolk and State of Massachusetts, have invented certain new and useful Improvements in Film-Cleaning Devices, of which the following is a specification.

This invention relates to devices for cleaning the films of moving picture machines and one of the principal objects of the invention is to provide simple and efficient means for thoroughly cleaning both sides of the film as it is rewound on one of the reels.

Another object of the invention is to provide a simple device adapted to be secured to the table upon which the reels are mounted, said device comprising a pair of removable pads for the upper and lower surface of the film, said pads being removably secured to a pair of blocks hinged together and provided with means for locking them in position to permit the film to pass between the pads, as it is rewound upon the reel.

Still another object of the invention is to provide a film cleaner having a pair of brushes secured thereto at a point some distance from the intake end of the cleaning device, said brushes being designed for sweeping off any particles which would be liable to injure the film in passing between the pads.

It is a well known fact that the films of moving picture machines are liable to collect dust, dirt, drops of oil or other particles which are very much magnified in the reproduction of the pictures and which have a tendency to destroy the effect of the same upon the canvas or curtain.

My invention has for its object a simple device to be secured between the two reels for thoroughly cleaning both sides of the film during the rewinding operation.

These and other objects may be attained by means of the construction illustrated in the accompanying drawings, in which, Figure 1 is a side elevation of a pair of reels and my film cleaning device secured to the table between the reels. Fig. 2 is a side elevation of the film cleaning device on an enlarged scale when compared to Fig. 1. Fig. 3 is a vertical longitudinal section taken centrally through the film cleaner and film. Fig. 4 is a top plan view of the same. Fig. 5 is a transverse vertical section taken on the line 5—5 of Fig. 2 looking in the direction indicated by the arrows. Fig. 6 is a similar view taken on the line 6—6 of Fig. 2 looking in the direction indicated by the arrows. Fig. 7 is a section taken on the line 7—7 of Fig. 2 looking in the direction indicated by the arrows.

Referring to Fig. 1 of the drawing the numeral 1 designates a table or stand upon which is mounted in any suitable manner the reels $1^x$ and 2. Secured to the top of the table 1 between the reels is my film cleaner, comprising, preferably, a metal base 3 connected by means of a hinge 4 at one end to a small plate 5. The base 3 and plate 5 are secured to the table 1 by means of suitable thumb screws 6. One of the pad holders 7 is secured by means of screws $8^a$ to the base member 3, said pad holder having an inclined upper surface and being larger at one end 8 than at the other end 9. The pad holder 7 is provided with a central longitudinal guideway 10 for the film and upon opposite sides of the guideway 10 are upwardly projecting guides 11 designed for holding the film in a straight line as it passes through the cleaner.

Detachably connected to the pad holder 7 is a strip or pad of flexible material 12, preferably formed of fabric, such as plush, felt, flannel or other similar material which will thoroughly clean the film without scratching or otherwise injuring the same. The strip of material 12 is connected to the pad holder 7 by means of pivoted clamps 13. It is to be noted that the ends of the pad holder 7 are rounded off, as shown at 14.

The upper pad holder $7^a$ is provided with an inclined under surface comprising a projecting portion 15 which fits within the guideway 10 and the sides of the projecting portion 15 are cut away to accommodate the guides 11 of the pad holder 7, as shown more particularly in Fig. 5. Pivoted clamps 16 are connected to the opposite ends of the pad holder $7^a$ for holding a strip of fabric or cleaning material 17. A piece of glass 18 is secured in a recess in the top of the pad holder 7, said glass lying flush at its upper surface with the top of said pad holder. This glass plate serves as a convenient means for splicing or connecting together the ends of the film when broken. Metal protectors 19 may be secured to the corners of the upper pad holder 7ª. The pad holders 7 and 7ª are connected together by means of hinges 20 at one side, while at the opposite side a spring metal lock or hasp 21 is secured by means of rivets 22 to the holder 7 and is adapted to spring over a stud 23 projecting outward from the pad holder 7ª. As shown more clearly in Figs. 2 and 5 the stud 23 is beveled upon its lower side to ride into the opening in the spring hasp 21.

Secured to the base 3 at some distance from the intake end of the cleaner is a rectangular metal frame 24, in which is secured an upper brush 25 and a lower brush 26 of suitable form to remove gritty particles from the film before it passes through the cleaner.

The operation of my invention may be briefly described as follows: The film A is passed between the brushes 25 and 26 and between the pads during the rewinding operation of the film, the brushes serving to remove particles which would scratch or mutilate the film in passing between the pads. After the rewinding operation the spring lock 21 is released and the pad holder 7ª swung backward to permit the film to be removed.

From the foregoing it will be obvious that the film cleaner made in accordance with my invention is of simple construction, is reliable and efficient for its purpose of thoroughly cleaning both sides of the film, does not interfere with the rewinding operation, does not take extra time in the cleaning operation and can be placed between the two reels without being in the way of the projecting apparatus. The glass plate at the top of the cleaner is very useful for mending films. The pads may be readily reversed whenever required and new pads may be applied in short order.

Having thus fully described the invention what is claimed as new is:

1. A film cleaner comprising a pair of pads between which the film is passed during the rewinding operation and a pair of brushes located at one end of the cleaner.

2. A film cleaner comprising pad holders having inclined surfaces, said pad holders being hinged together and provided with a lock, the ends of said pad holders being rounded off to permit the film to pass through the cleaner between the pads.

3. A film cleaner comprising a hinged base, a pad holder connected to the base and provided with a guideway extending longitudinally thereof, means for securing a pad to said holder, an upper pad holder hinged to the first mentioned pad holder, a lock for connecting the two pad holders in position for use, said pad holders having inclined meeting faces and rounded ends.

4. A film cleaner comprising a pair of pads having oppositely inclined faces, said pads being hinged together and provided with a lock, pivoted clamps for removably holding the pads to said holders, a pair of brushes disposed at one end of the cleaner, and means for passing the film between said pads and brushes.

In testimony whereof I affix my signature in presence of two witnesses.

FREDERICK E. MORTIMER.

Witnesses:
HOWARD J. HEICHENRODER,
LYMAN W. GRIFFIN.